United States Patent
Engel et al.

(10) Patent No.: US 10,766,700 B2
(45) Date of Patent: Sep. 8, 2020

(54) MODULAR AND CONFIGURABLE PICK/PUT WALL

(71) Applicant: Intelligrated Headquarters, LLC, Mason, OH (US)

(72) Inventors: Christopher M. Engel, Mason, OH (US); Hazem N. Nashif, Oakland, CA (US); Joseph B. Nentwig, Media, PA (US); Lance Reese, Kaysville, UT (US); William J Godschalk, Cincinnati, OH (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 507 days.

(21) Appl. No.: 15/189,066

(22) Filed: Jun. 22, 2016

(65) Prior Publication Data

US 2017/0015502 A1    Jan. 19, 2017

Related U.S. Application Data

(60) Provisional application No. 62/193,916, filed on Jul. 17, 2015, provisional application No. 62/270,788, (Continued)

(51) Int. Cl.
    *B65G 1/06*     (2006.01)
    *B65G 1/04*     (2006.01)
    (Continued)

(52) U.S. Cl.
    CPC .......... *B65G 1/065* (2013.01); *B65G 1/0492* (2013.01); *B65G 1/10* (2013.01); *B65G 1/1373* (2013.01);
    (Continued)

(58) Field of Classification Search
    CPC ........ B65G 1/065; B65G 1/0492; B65G 1/10; B65G 1/1373; B65G 1/1375; B65G 2209/04
    See application file for complete search history.

(56) References Cited

U.S. PATENT DOCUMENTS 3,586,178 A * 6/1971 Zurheide .................. B65G 1/10
                                                    211/85.8
5,567,102 A * 10/1996 Tanaka ..................... B65G 1/00
                                                    414/274
(Continued)

FOREIGN PATENT DOCUMENTS

DE    102005032533 A1    1/2007
EP       1862406 A      12/2007
(Continued)

OTHER PUBLICATIONS

International Search Report, Written Opinion and Search Strategy for International Application No. PCT/US2016/39822 dated Sep. 8, 2016.

*Primary Examiner* — Saul Rodriguez
*Assistant Examiner* — Ashley K Romano
(74) *Attorney, Agent, or Firm* — Alston & Bird LLP (57) ABSTRACT

A modular order fullment system uses a number of inexpensive mobile apparatuses such as containers with horizontally accessible bins that are brought to a stationary frame that supports a pick-to-light system to direct a human or robotic operator to pick from or put to receptacles in the mobile apparatus.

19 Claims, 9 Drawing Sheets

Related U.S. Application Data filed on Dec. 22, 2015, provisional application No. 62/328,658, filed on Apr. 28, 2016.

(51) Int. Cl.
*B65G 1/10* (2006.01)
*B65G 1/137* (2006.01)

(52) U.S. Cl.
CPC ........ B65G 1/1375 (2013.01); *B65G 2209/04* (2013.01)

(56) References Cited

U.S. PATENT DOCUMENTS

| | | | |
|---|---|---|---|
| 5,899,569 A | 5/1999 | Pinto et al. | |
| 9,785,911 B2* | 10/2017 | Galluzzo | B25J 5/007 |
| 2007/0050080 A1* | 3/2007 | Peck | B65G 1/137 |
| | | | 700/214 |
| 2008/0183327 A1* | 7/2008 | Danelski | B65G 1/137 |
| | | | 700/216 |
| 2014/0277693 A1* | 9/2014 | Naylor | B65G 1/0492 |
| | | | 700/218 |
| 2015/0032252 A1* | 1/2015 | Galluzzo | B25J 5/007 |
| | | | 700/218 |
| 2015/0073589 A1* | 3/2015 | Khodl | B25J 5/007 |
| | | | 700/218 |
| 2015/0081088 A1* | 3/2015 | Lyon | G06Q 10/0875 |
| | | | 700/216 |
| 2016/0101940 A1* | 4/2016 | Grinnell | G05D 1/0297 |
| | | | 700/216 |
| 2017/0101264 A1* | 4/2017 | Brumm | B60L 5/40 |
| 2017/0138069 A1* | 5/2017 | Omori | B65G 1/065 |
| 2018/0186572 A1* | 7/2018 | Issing | B65G 1/1378 |
| 2018/0293536 A1* | 10/2018 | Galluzzo | G05D 1/0088 |

FOREIGN PATENT DOCUMENTS

| | | |
|---|---|---|
| EP | 2484608 A1 | 8/2012 |
| JP | H01285511 A | 11/1989 |
| JP | H0891514 A | 4/1996 |
| JP | 2003206009 A | 7/2003 |
| JP | 2004107003 A | 4/2004 |
| JP | 2005212962 A | 8/2005 |

* cited by examiner

MODULAR AND CONFIGURABLE PICK/PUT WALL

CLAIM OF PRIORITY UNDER 35 U.S.C. § 119

The present Application for patent claims priority to (i) U.S. Provisional Patent Application No. 62/193,916 filed on Jul. 17, 2015; (ii) U.S. Provisional Patent Application No. 62/270,788 filed on Dec. 22, 2015; and (iii) U.S. Provisional Patent Application No. 62/328,658 filed on Apr. 28, 2016, all entitled "Modular and Configurable Pick/Put Wall", all assigned to the assignee hereof, and all hereby expressly incorporated by reference herein.

BACKGROUND OF THE INVENTION

Field of the Invention

The field of art disclosed herein pertains to devices order fulfillment systems that direct operators using a light module for a particular slot, and more particularly to pick walls that incorporate light modules.

Description of the Related Art

Order fulfillment such as for e-commerce or store replenishment for less than a full container of products is often accomplished by having an operator directed to pick a product from a donor container and put the product into an order container. Reading a display or piece of paper with the order is an inefficient approach when the permutations of possible donor containers and order containers increases. To provide for better efficiency and accuracy, many distribution centers and warehouses rely upon a pick-to-light (PTL) system in order to direct an operator to where the pick or put is to occur. The PTL can include alphanumeric and colored information that is located at the particular destination to inform and guide the operator. A warehouse management system (WMS) keeps track of the inventory and the orders to be filled and is integrated with the PTL system to direct the pick or put operation and to receive confirmation of its completion.

While PTL systems frequency achieve a return on investment (ROI) that quickly pays for the infrastructure investment by reducing the amount of labor required, there is still considerable investment involved. Automating delivery and take-away of the containers can require a sizeable investment to satisfy throughput demands, especially during a peak season. A need exists for taking maximum advantage of the PTL systems capacity without necessary installing more automated conveyances.

BRIEF SUMMARY

The illustrative embodiments of the present disclosure provide an order fulfillment system that includes a receiving apparatus with a front frame having an array of node locations located proximate to one or more openings. More than one mobile apparatus are sequentially positionable behind the receiving frame to align more than one receptacle for holding articles with one of the array of node locations. A light order fulfillment system includes more than one article indicating module each mounted to a respective node location on the front frame of the receiving apparatus.

According to at least one aspect of the present disclosure, a modular pick wall includes a free-standing frame mountable to a floor and including at least one vertical support and more than one attachable horizontal arms. The modular pick wall includes more than one pick-to-light module attached to the more than one attachable horizontal arms.

According to at least one aspect of the present disclosure, a method of performing order fulfillment is provided. In one or more embodiments, the method includes positioning one of a plurality of mobile apparatuses containing receptacles behind a free-standing frame having attached pick-to-light modules that correspond to the receptacles of the mobile apparatus. The method includes directing one of a pick-to-light and put-to-light operation via a selected pick-to-light module for a receptacle. The method includes replacing the one with another of the plurality of mobile apparatuses. The method includes directing another one of a pick-to-light and put-to-light operation via a selected pick-to-light module for a receptacle of the other mobile apparatus.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE FIGURES

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Generally-known pick face and put walls are rigid, not easily configured and re-configured, fixed methods of installation and the configuration does not optimize the space per order profiles over time. The present disclosure provides a configurable put wall to maximize the put face for as many orders assigned to the put face as possible. Thereby, order fillers can be directed efficiently while ensuring accuracy.

In at least one embodiment, configuration can be accomplished using light bars cut to the length of the put wall. For example, xD Pick-to-Light (PTL) devices can be installed within the light bar from end to end. Each Light bar can have an identifier (ID) that is associated with the specific details of the light bar PTL device configuration. Light bars can be electronically connected to a cloud server and mechanically attached to the put wall structure. The light bars are easily removed and attached to the Put Wall modules.

Order fulfillment managers can use a put will configuration application, running on a cloud server, to create, store, and edit Put Wall module configurations. Each of the configurations can have a unique ID. The manager will be allowed to activate one configuration per module as determined by their business intelligence. Additionally the application can be capable of configuring and storing light bar configuration by the light bar ID. The light bar information can also be editable. To physically configure a module the manager can place the light bars on the desired shelves and connect the required cabling. The manager can place the configuration application in put wall module build (configuration) mode. This will direct the manager to scan the light bar ID and input the bay and shelf the light bar is installed on. The manager can then activate the desired put wall module configuration. The configuration application validates the light bars installed. The PTL application then lights the light(s) indicating the cubby width by color. The manager can optionally install cubby vertical dividers (or not) the PTL application directs the order filler to the required location by the flashing light(s).

Order fulfillment managers can use a modular cart configurator. The cart configurator is an application, to create, store, and edit modular cart configurations. Each of the carts can have an ID; the cart configuration can be associated with this cart ID.

A user will place the modular cart configurator application in cart build (configuration) mode. This will direct the manager to enter the cart ID and input cart configuration information. The user inputs each shelf on the cart, each light location and light type as associated with slots/cubby's on the cart. Additionally, each slot/cubby on the cart is given a volume. The cart configuration is saved and associated with the cart ID. Each cart ID and configuration is identified to the order management application.

The order management application will assign orders to the modular cart. Orders are assigned based on order volume and slot/cubby size on the cart. Larger orders by volume will be assigned to larger slots on the cart, while small orders are assigned to the small slot/cubby's. As carts move from station to station the cart ID is provided to the order management application, with the knowledge of the cart configuration and the orders assigned to the cart the order filler is directed to pick items required for the orders and then light directed to place them into the slots/cubby's on the cart. Once the item is placed in the slot/cubby on the cart the order filler confirms their action by pressing the flashing light on the PTL device associated with the slot/cubby.

The order management application uses the cart configuration knowledge to light put locations on the cart once the cart is docked at a frame. Flexible light features allow an efficient (least amount of lights) light configuration. The PTL devices are capable of allowing the application to control dual slot/cubby assignments, locations above and below the device. A horizontal bar on the frame, with PTL devices installed, is not needed for every shelf on the cart. The PTL device also has programmable light colors providing slot/cubby width identification. Additionally the carts can vary horizontally in slot/cubby width. The PTL devices are controlled to adjust to the configured width of the cart slot/cubby.

The frame is configured to light direct order fillers on carts of varying configurations, some with slots/cubby's above and below the frame horizontal bars and some with larger slots/cubby's only above the frame. On a vertical axis, the cart slot/cubby widths are variable across the length of the frame.

This allows varying cart configurations with efficient fixed frame PTL configurations.

Turning now to the Drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts with like numerals denote like components throughout the several views. However, it will be apparent to those skilled in the art that these concepts may be practiced without these specific details, in some instances, well known structures and components are shown in block diagram form in order to avoid obscuring such concepts.

Figure 1:
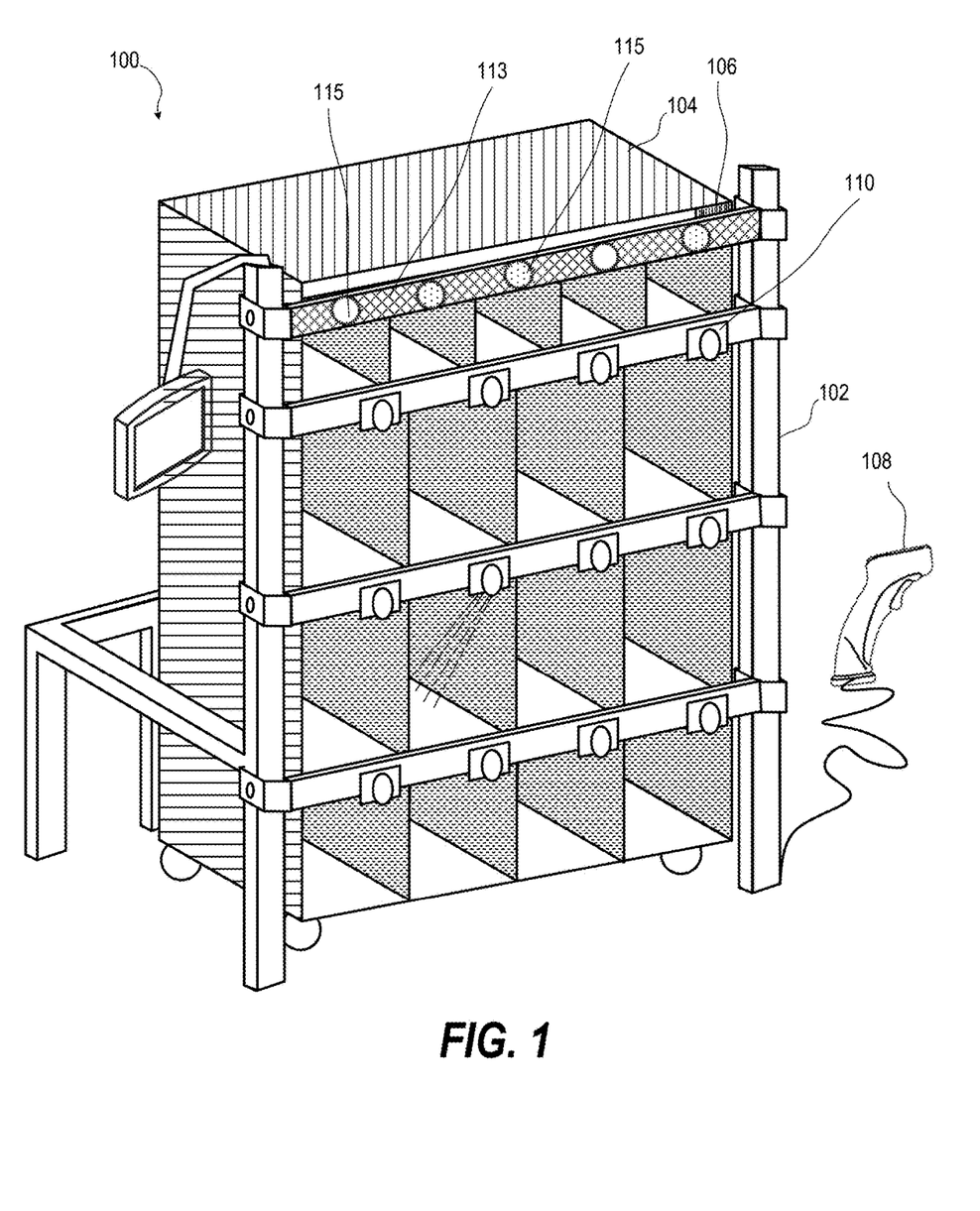
FIG. 1 illustrates a perspective view of an order fulfillment system including a modular pick/put wall that sequentially receives a modular apparatus for performing a pick or put operation, according to one or more embodiments.

FIG. 1 illustrates an order fulfillment system 100 that includes a modular pick/put wall 102 that sequentially receives a modular apparatus 104 for performing a pick or put operation, according to one or more embodiments. The modular apparatus 104 can be an economical cart that is manually or robotically moved A unique code 106 on the modular apparatus 104 can be read by the pick/put wall 102, such as by a bar code identification reader 108. Alternatively, the modular apparatus 104 can have a radio frequency identification (RFID) device that can be read. Alternatively, a machine vision system (not shown) can visualize the configuration of cubbies and bays provided by the modular apparatus 104 and identify the configuration. Pick or put to light (PTL) components 110 can be manually or automatically positioned to provide indications to particular bays, cubbies, or portions thereof. Alternatively, light bars can have multiple areas that can be selectively actuated to correspond to a configured location. The PTL components 110 can assist in providing an indication by using a backlight to illuminate a particular location in the modular apparatus 104.

Figure 2:
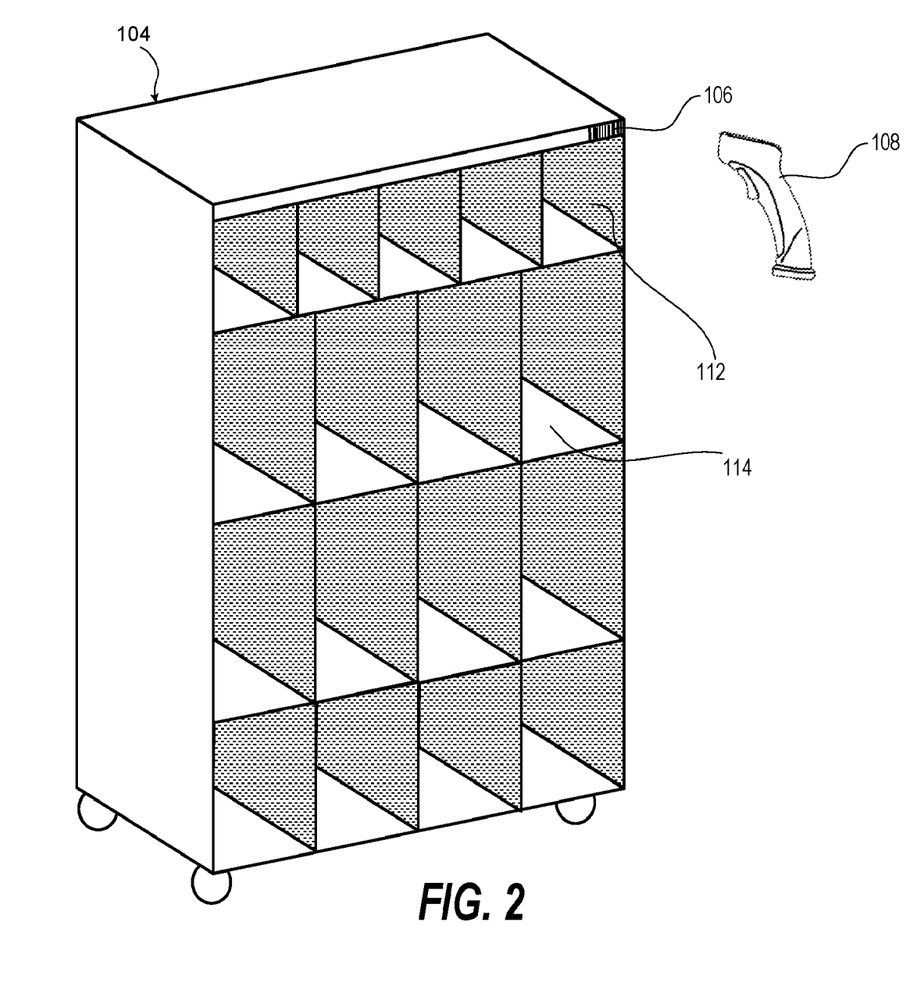
FIG. 2 illustrates a perspective view of one modular apparatus of FIG. 1 that is being read by an identification reader, according to one or more embodiments.

FIG. 2 illustrates a modular apparatus 104 that is being read by the identification reader 108. Vertical and horizontal dividers 112, 114 can be insertable and/or repositionable to physically reconfigure the modular apparatus 104.

Figure 3:
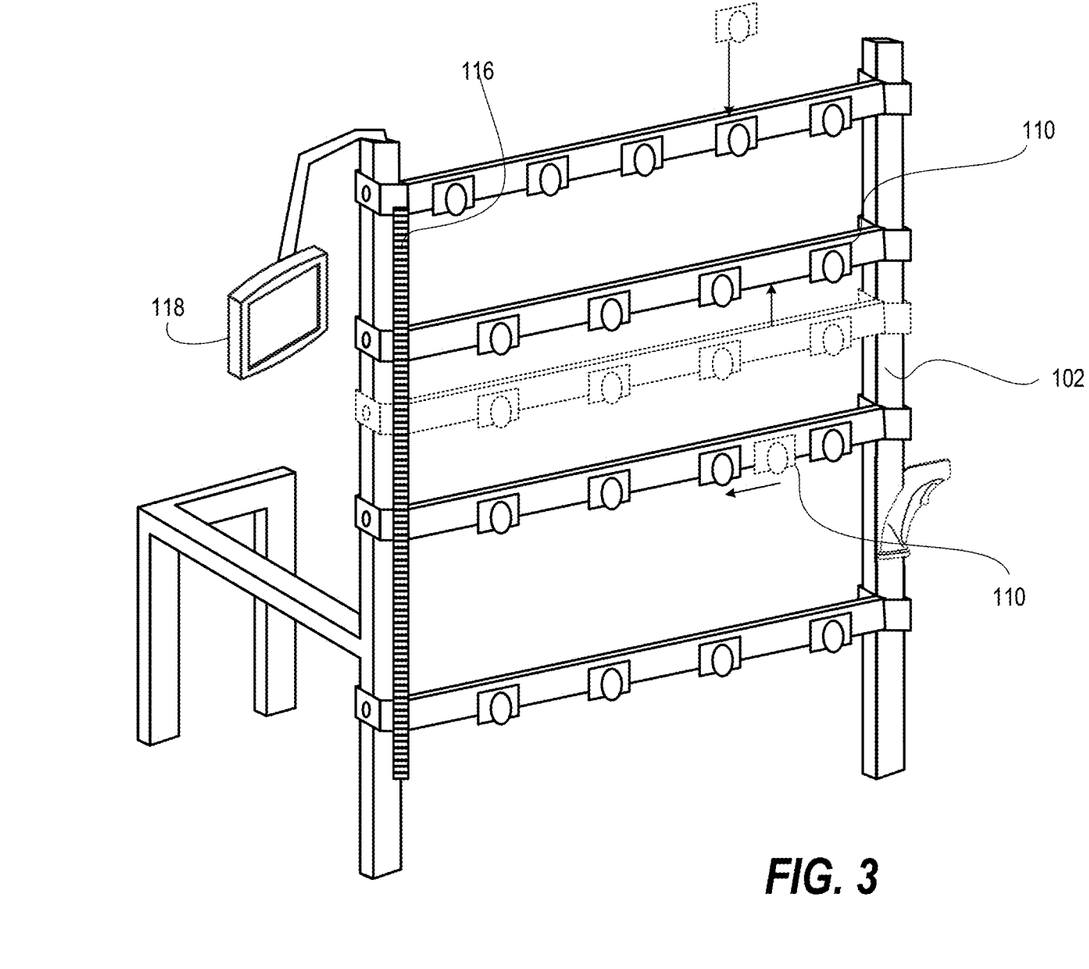
FIG. 3 illustrates a perspective view of the modular pick/put wall of FIG. 1, according to one or more embodiments.

FIG. 3 illustrates a perspective view of the modular pick wall 102 that is free standing, according to one or more embodiments. An overall system cost can be reduced by having one modular pick wall 102 and operator receive multiple modular apparatuses 104 for an order fulfillment operation. The PTL components 110 can be vertically and/or horizontally repositionable as well as insertable for increasing density. A vertical light bar 116 can guide an operator for manual vertical repositioning. A user interface 118 can be provided for messaging, querying, and confirmation of order fulfillment operations.

Figure 4:
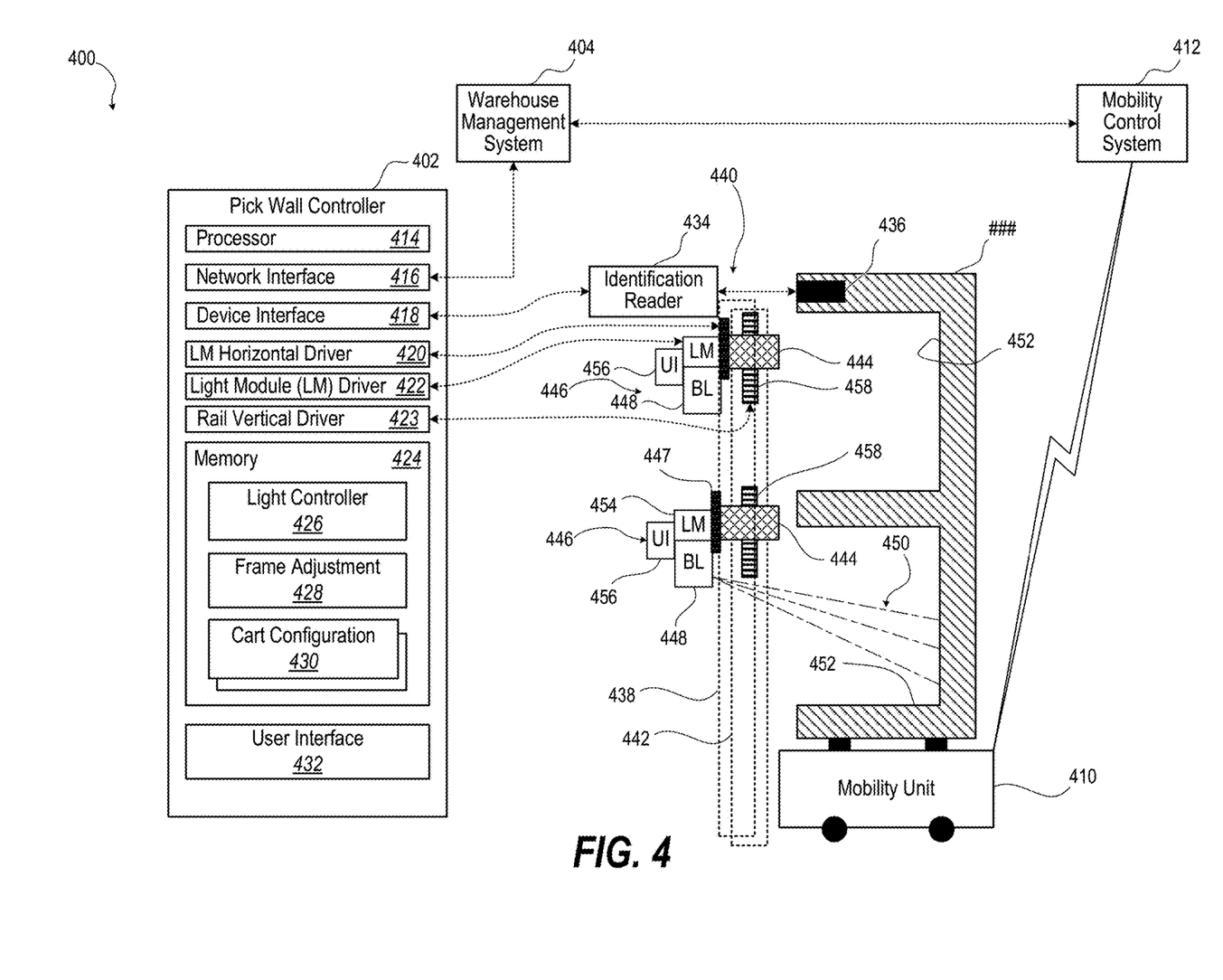
FIG. 4 illustrates a conceptual block diagram of an order fulfillment system, according to one or more embodiments.

FIG. 4 illustrates an order fulfillment system 200 according to one or more embodiments.

Figure 5:
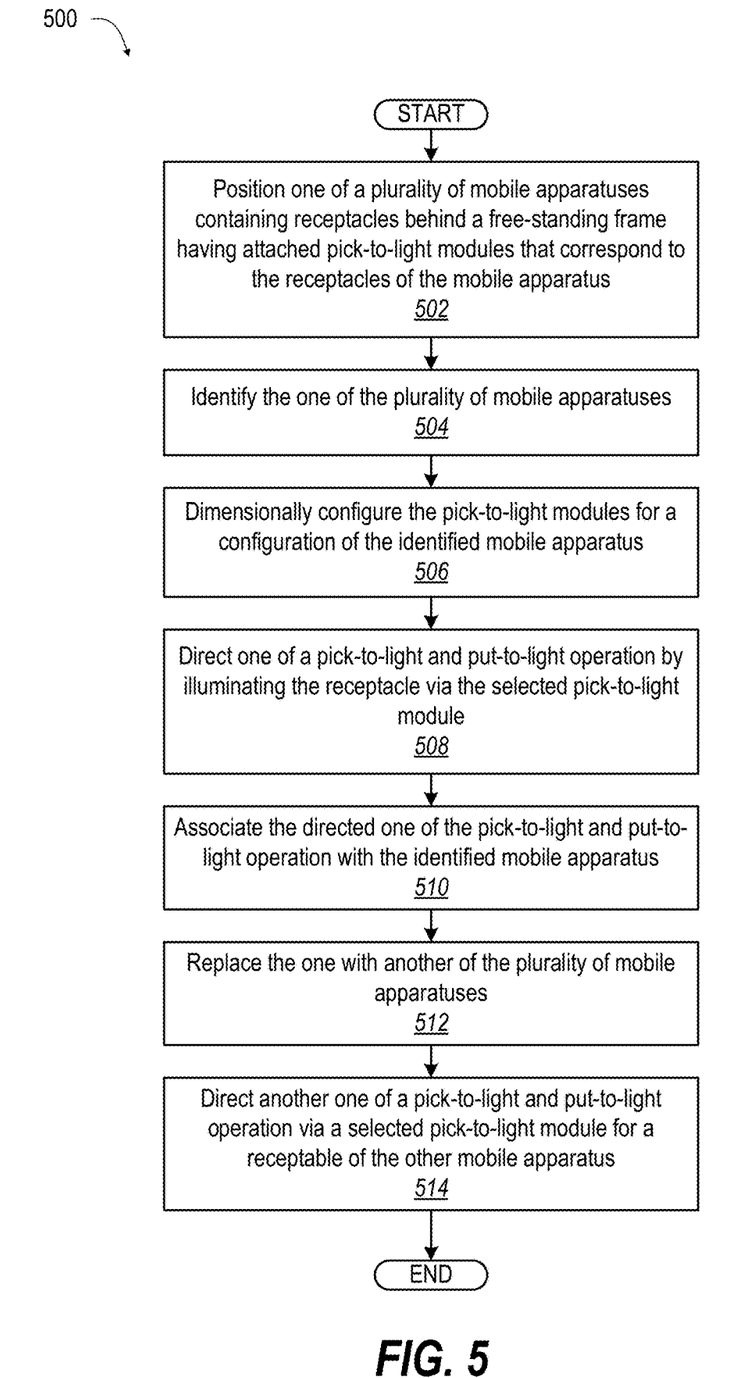
FIG. 5 illustrates a method of performing order fulfillment with a modular pick/put wall, according to one or more embodiments.

FIG. 5 illustrates a method 500 of performing order fulfillment with a modular pick wall, according to one or more embodiments. Method 500 includes positioning one of a plurality of mobile apparatuses containing receptacles behind a free-standing frame having attached pick-to-light modules that correspond to the receptacles of the mobile apparatus (block 502). Method 509 includes identifying the one of the plurality of mobile apparatuses (block 504). Method 500 includes dimensionally configuring the pick-to-light modules for a configuration of the identified mobile apparatus (block 506). Method 500 includes directing one of a pick-to-light and put-to-light operation by illuminating the receptacle via the selected pick-to-light module (block 508). Method 500 includes associating the directed one of the pick-to-light and put-to-light operation with the identified mobile apparatus (block 510). Method 500 includes replacing the one with another of the plurality of mobile apparatuses (block 512). Method 500 includes directing another one of a pick-to-light and put-to-light operation via a selected pick-to-light module for a receptable of the other mobile apparatus (block 514).

In the above described flow chart, one or more of the methods may be embodied in a computer readable device containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Figures 6, 7, 8:
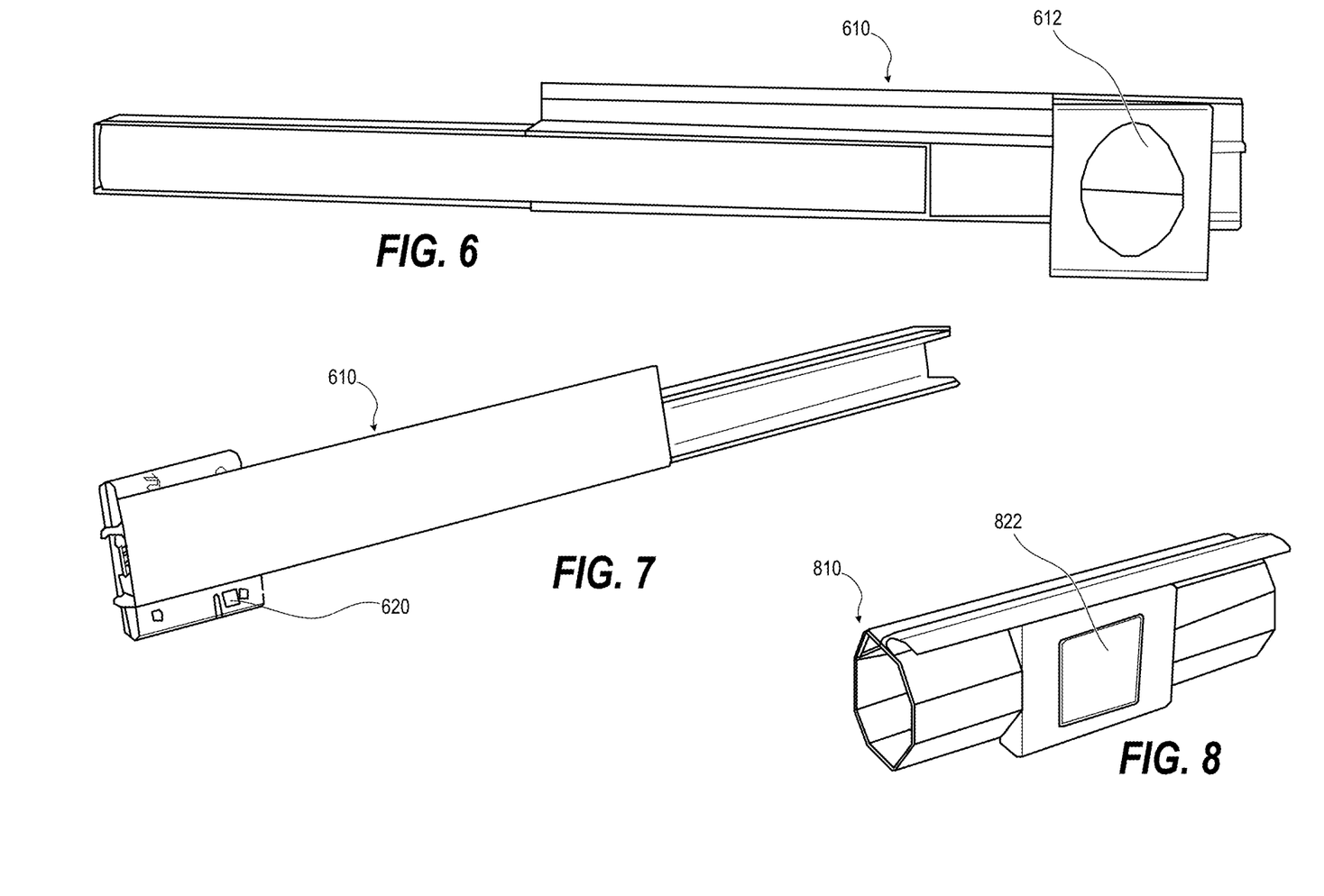
FIG. 6 illustrates a depiction of a front isometric view of an example pick-to-light (PTL) component for the modular pick/put wall of FIG. 1, according to one or more embodiments.
FIG. 7 illustrates a depiction of a rear isometric view of the example PTL component of FIG. 6 having a back light, according to one or more embodiments.
FIG. 8 illustrates a depiction of a front isometric view of another example PTL component for the modular pick/put wall of FIG. 1, according to one or more embodiments.

FIGS. 6-7 illustrate example pick-to-light (PTL) component 610. FIG. 7 illustrates a back light 620, according to one or more embodiments. FIG. 8 illustrates another example PTL component. Features of a back light pick to light (bL PTL) device 810 can include (1) single button/light, multi-color light 822, having a small footprint. No bay display and/or hay light is required. Can include a bay display device for messages, queries, multi-induct (cluster picking) and exception handling. The bL PTL devices can support flexible zones with dynamic zoning throughout the day. The bL, PTL devices can support order filler selection, and zone and order filler demarcation. A bL PTL device can be assigned to one single location or to two locations for dual location use, the latter reducing the number of devices required. The bL PTL device can include a plastic face, plastic button and cable connection to control programmable multi-color light emitting diodes (LEDs).

Figure 9:
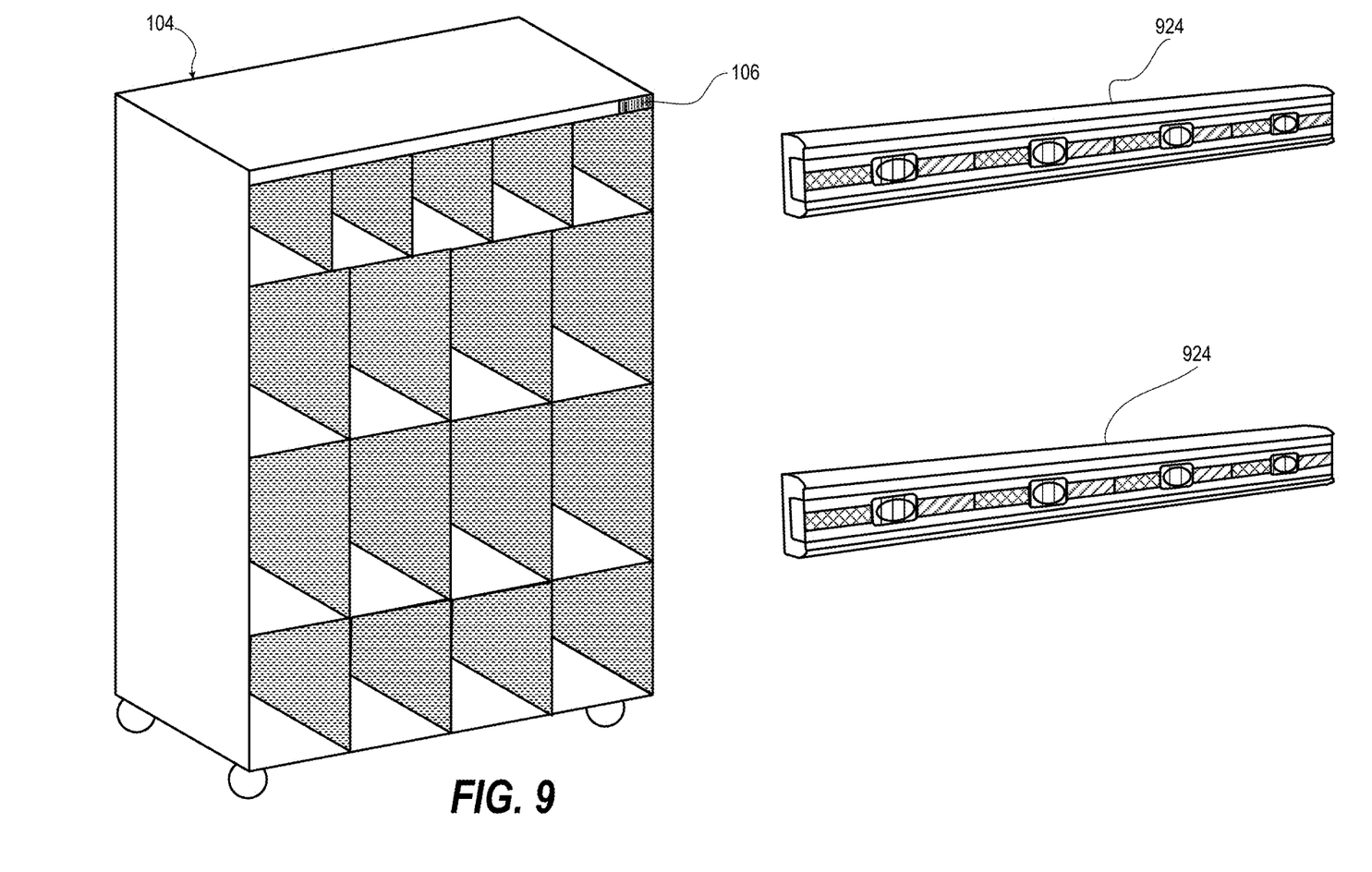
FIG. 9 illustrates a perspective view of one modular apparatus of FIG. 1 that is being configured with PTL components of FIG. 7, according to one or more embodiments.
Figure 10:
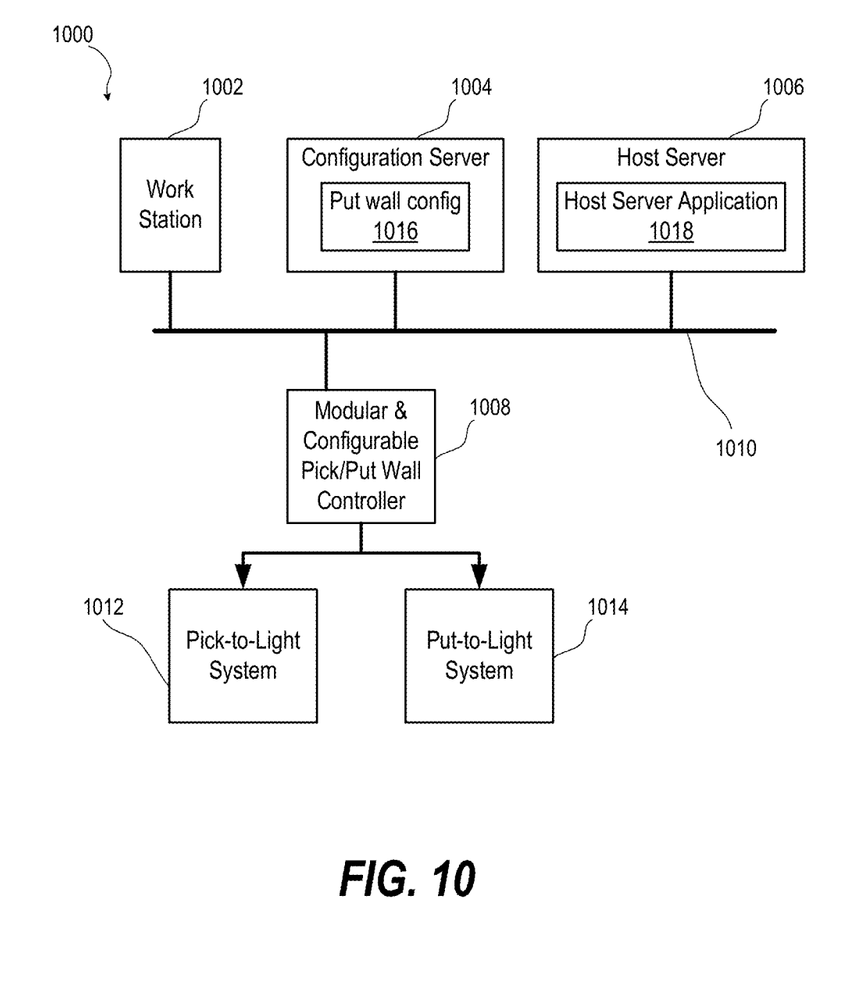
FIG. 10 illustrates a block diagram of an exemplary computing system for configuring and controlling the PTL components of the pick/put wall, according to one or more embodiments.

FIG. 9 illustrates a perspective view of one modular apparatus of 104 that is being configured with PTL components of 610 configured in a light bar 924, according to one or more embodiments. FIG. 10 illustrates a block diagram of an exemplary computing system for configuring and controlling the PTL components of the pick/put wall, according to one or more embodiments.

FIG. 10 illustrates an automated wall configuration and control system 1000 of a work station 1002, configuration server 1004, host server 1006, and modular & configurable pick/put wall controller 1008 that communicate on a network 1010. The modular & configurable pick/put wall controller 1008 can control a pick-to-light system 1012 and/or a put-to-light system 1014. For configuration management, order fulfillment managers can use a Put Wall configuration application 1016, running on a configuration management server 1004. Installed on this server is the Put Wall configurator, this configurator will allow authorized managers to create, store, and edit Put Wall bay configurations. Each of the bay configurations will have a unique ID. The manager will be allowed to activate Put Wall bays per Put Wall station as determined by their business intelligence/requirements. In one embodiment, automated information for configuration is provided by a host server application 1018 executing on the host server 1006.

Bay Template editor: Managers logon to the configuration application 1016 and create Put Wall bay templates. This is accomplished by entering the bay ID and the number of shelves with in the bay. Then, shelf by shelf defining the number of cubby's and the width of each cubby. Included in the dimensioning is the estimated volume of each cubby, this value is entered after the cubby width and shelf height has been set. Once the bay template is defined it is saved under the entered bay ID.

Station editor: The manager then uses the station editor to configure and define each Put Wall configuration. The station editor allows the manager to enter the station ID and edit the Put Wall station bay by bay. The manager selects the desired bay by clicking on a drop down box representing the bay. The drop down box displays the possible bay templates to select from. The manager selects the desired bay template. This is repeated for each bay requiring configuration or editing. Once complete the manager "applies" the bay configurations to the selected Put Wall station.

Configuration validation: The manager can run the validation test to physically validate the Shelves and configure the cubby widths. A shelf test will light each shelf from top to bottom in sequence indicating that all expected shelves are installed. Then the cubby widths can be validated by selecting one shelf at a time, the validation then lights the PTL devices the width of each cubby on the selected shelf with varying colors. The cubby partitions can then be installed as indicated by the lighted lights.

Additionally the manager can verify the logically configured station matches the physical shelving by running a station validation test. This validation will light up the selected Put Wall station one shelf and one cubby at a time. Based on the sequence and the pattern the manager can validate a successful Put Wall station configuration. By running the validation the manager can ensure the physical station configuration matches the logical setup of the PTL devices. The Put Wall stations are ready for fulfillment.

In operation, an order filler scans an inbound item the cubby lights up. Order filler places item in the cubby and confirms action by pressing a flashing button associated with the cubby. Process is repeated until complete. The PTL application directs the order filler to the required location by the flashing light(s).

Figure 11:
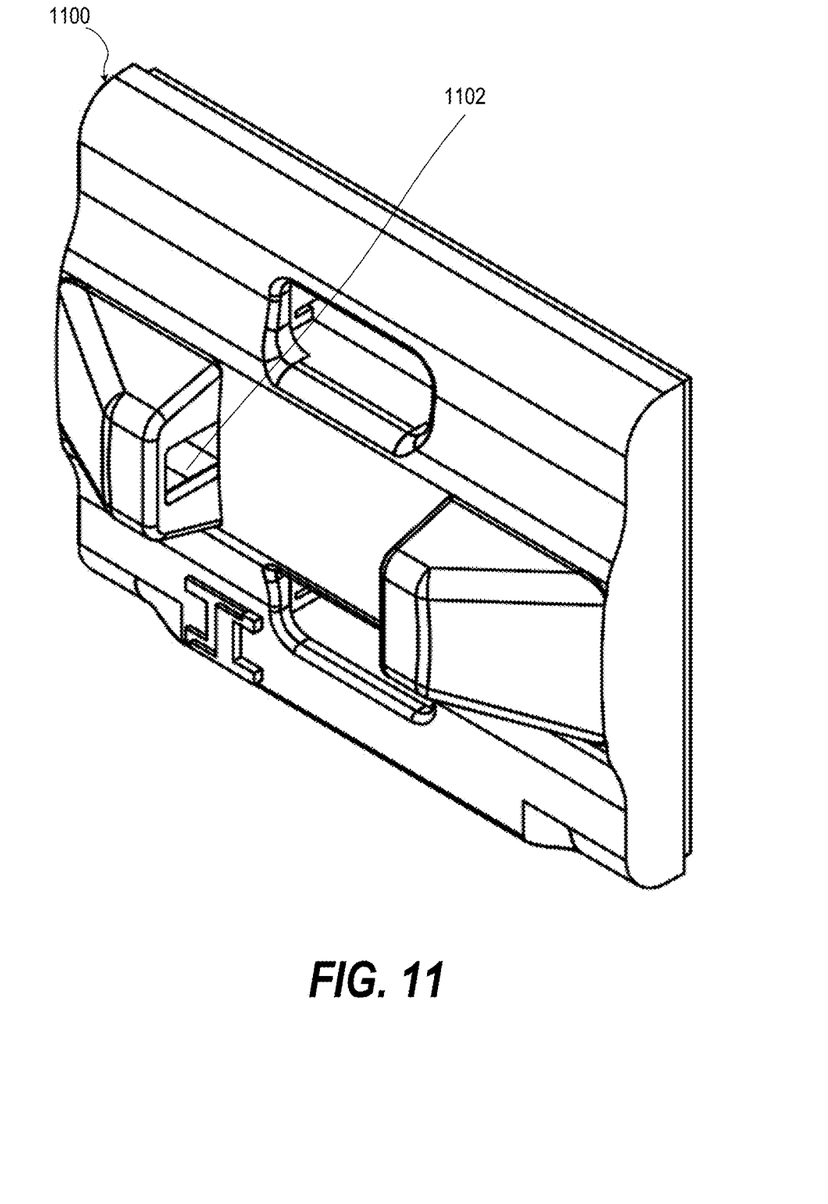
FIG. 11 illustrates an optical touch switch for an example PTL system, according to one or more embodiments.

FIG. 11 illustrates an PTL component 1100 that includes an optical touch switch 1102 that provides a long service life even with a high number of operations. In addition, operators find that each pick can be confirmed in a second or two faster than when using a push button. Over the high number of picks that are routinely accomplished in a distribution center, this increased speed results in an increase in return on investment (ROI). In addition, it is desirable, swiping a finger through the optical touch switch 1102 have ergonomic benefits to the operator.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

All publications, patents and patent applications cited herein, whether supra or infra, are hereby incorporated by reference in their entirety to the same extent as if each individual publication, patent or patent application was specifically and individually indicated as incorporated by reference. It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

It must be noted that, as used in this specification and the appended claims, the singular forms "a," "an" and "the" include plural referents unless the content clearly dictates otherwise. Thus, for example, reference to a "colorant agent" includes two or more such agents.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As will be appreciated by one having ordinary skill in the art, the methods and compositions of the invention substantially reduce or eliminate the disadvantages and drawbacks associated with prior art methods and compositions.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. An order fulfillment system, comprising:
   a receiving apparatus comprising a front frame having a pair of vertical supports that receives one or more horizontal bars having an array of node locations located proximate to one or more openings;

a mobile apparatus, wherein the mobile apparatus having at least one receptacle is positionable behind the front frame of the receiving apparatus so as to align an opening of the receptacle for holding articles with one of the array of node locations such that the receptacle located behind the front frame is accessible for article retrieval by passing through the one or more openings of the front frame of the receiving apparatus; and a light order fulfillment system comprising more than one article indicating module, wherein each module is mounted to a respective node location on the one or more horizontal bars of the receiving apparatus and configured to selectively illuminate the receptacles of the mobile apparatus docked behind the receiving apparatus.

2. The order fulfillment system of claim 1, further comprising a pick-to-light controller that is in communication with a warehouse management system to interact with an operator to effect one of a pick from or put to a selected receptacle.

3. The order fulfillment system of claim 2, further comprising:
   an identification reader to read an identification artifact carried by the mobile apparatus; and
   a controller in communication with the identification reader to read an identifier of the configuration of receptacles and to configure operation of the light order system to the configuration of receptacles.

4. The order fulfillment system of claim 1, wherein the mobile apparatus comprises a mobile container with horizontally accessible receptacles formed by horizontal and vertical dividers.

5. The order fulfillment system of claim 1, wherein one or more of the horizontal bars are vertically adjustable on the vertical supports to align with one of a top and a bottom of a selected receptacle of a selected mobile apparatus.

6. The order fulfillment system of claim 5, further comprising:
   an identification reader configured to read an identification artifact carried by the mobile apparatus; and
   a controller in communication with the identification reader configured to read an identifier of the configuration of receptacles and to configure operation of the light order system by positioning the array of node locations to correspond to the configuration of receptacles.

7. The order fulfillment system of claim 6, wherein one or more of the node locations are horizontally adjustable.

8. The order fulfillment system of claim 6, wherein one or more of the node locations are automatically adjustable.

9. The order fulfillment system of claim 6, wherein a selected node location is electrically selectable from a range of node locations that include at least one unselected node location that does not correspond to any receptacle.

10. The order fulfillment system of claim 1, wherein each of the article indicating modules includes receptacle illuminating light.

11. The order fulfillment system of claim 1, wherein receiving apparatus is mounted to a floor and comprises a stopping structure configured to laterally constrain a received mobile apparatus.

12. The order fulfillment system of claim 1, further comprising:
    an autonomous robot to move a selected mobile apparatus; and
    a mobility control system to direct the autonomous robots to move the mobile apparatus.

13. An order fulfillment system, comprising:
    a receiving apparatus comprising a front frame having a pair of vertical supports that receives one or more horizontal bars defining one or more openings;
    an array of node locations located on the one or more horizontal bars proximate to the one or more openings; and
    a light order fulfillment system comprising more than one article indicating module, wherein each module is mounted to a respective node location on the one or more horizontal bars of the receiving apparatus,
    wherein the receiving apparatus is configured to receive a mobile apparatus positionable behind the front frame so as to align an opening of a receptacle for holding articles with one of the array of node locations such that the receptacle located behind the front frame is accessible for article retrieval by passing through the one or more openings of the front frame of the receiving apparatus,
    wherein the light order fulfillment system is configured to selectively illuminate the receptacles of the mobile apparatus docked behind the receiving apparatus.

14. The order fulfillment system of claim 13, further comprising a pick-to-light controller in communication with a warehouse management system and configured to interact with an operator to effect one of a pick from or put to a selected receptacle.

15. The order fulfillment system of claim 14, further comprising:
    an identification reader configured to, in an instance in which the receiving apparatus receives more than one mobile apparatus, read an identification artifact carried by each of the more than one mobile apparatus; and
    a controller in communication with the identification reader configured to read an identifier of the configuration of receptacles and to configure operation of the light order system to the configuration of receptacles.

16. The order fulfillment system of claim 13, wherein one or more of the horizontal bars are vertically adjustable on the vertical supports to align with one of a top and a bottom of a selected receptacle of the mobile apparatus.

17. The order fulfillment system of claim 13, wherein one or more of the node locations are horizontally adjustable.

18. The order fulfillment system of claim 13, wherein one or more of the node locations are automatically adjustable.

19. The order fulfillment system of claim 13, wherein the receiving apparatus is mounted to a floor and comprises a stopping structure configured to laterally constrain the mobile apparatus received by the receiving apparatus.

* * * * *